United States Patent
Miura

(10) Patent No.: US 10,645,256 B2
(45) Date of Patent: May 5, 2020

(54) IMAGE FORMING APPARATUS AND NON-TRANSITORY COMPUTER-READABLE STORAGE MEDIUM SUITABLE FOR EXTRACTING AREAS IN IMAGES SPECIFIED BY HANDWRITTEN MARKER BY LINE MARKER SUCH AS HIGHLIGHTER PEN OR THE LIKE, AND ELECTRONIC MARKER BY DIGITAL PEN

(71) Applicant: KYOCERA Document Solutions Inc., Osaka (JP)

(72) Inventor: Tomohiro Miura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/389,931

(22) Filed: Apr. 20, 2019

(65) Prior Publication Data
US 2019/0327389 A1 Oct. 24, 2019

(30) Foreign Application Priority Data
Apr. 20, 2018 (JP) ................. 2018-081173

(51) Int. Cl.
*H04N 1/60* (2006.01)
*G06K 9/00* (2006.01)
*H04N 1/00* (2006.01)
*G06K 9/20* (2006.01)

(52) U.S. Cl.
CPC ....... *H04N 1/6075* (2013.01); *G06K 9/00463* (2013.01); *G06K 9/2063* (2013.01); *H04N 1/00726* (2013.01); *H04N 2201/0094* (2013.01)

(58) Field of Classification Search
CPC ......... H04N 1/6075; H04N 2201/3245; G06K 9/00463; G06K 9/2063
USPC ....................... 358/520, 518, 1.18
See application file for complete search history.

(56) References Cited

U.S. PATENT DOCUMENTS

| | | | |
|---|---|---|---|
| 2003/0004991 A1* | 1/2003 | Keskar | G06F 40/169 715/230 |
| 2011/0141521 A1* | 6/2011 | Qiao | H04N 1/32112 358/1.16 |
| 2014/0245123 A1* | 8/2014 | Pircher | G06F 40/169 715/232 |

FOREIGN PATENT DOCUMENTS

JP H07-023210 A 1/1995

\* cited by examiner

*Primary Examiner* — Jamares Q Washington
(74) *Attorney, Agent, or Firm* — Hawaii Patent Services; Nathaniel K. Fedde; Kenton N. Fedde

(57) ABSTRACT

Provided is an image forming apparatus that extracts an area indicated by a marker. A scanner unit reads a first document having an area indicated by a handwritten marker. A panel unit displays first image data of the first document read by the scanner unit or second image data of the second document stored in a storage device. An electronic marker input unit indicates an area by an electronic marker with respect to the second image data. An area extracting unit, based on a hue difference, which is a difference between a color of the first document read by the scanner unit and a color of the handwritten marker, corrects a hue difference, which is a difference between a color of the second document and a color of the electronic marker, and extracts an area indicated by the handwritten marker or an area by the electronic marker.

3 Claims, 4 Drawing Sheets

IMAGE FORMING APPARATUS AND NON-TRANSITORY COMPUTER-READABLE STORAGE MEDIUM SUITABLE FOR EXTRACTING AREAS IN IMAGES SPECIFIED BY HANDWRITTEN MARKER BY LINE MARKER SUCH AS HIGHLIGHTER PEN OR THE LIKE, AND ELECTRONIC MARKER BY DIGITAL PEN

INCORPORATION BY REFERENCE

This application is based on and claims the benefit of priority from Japanese Patent Application No. 2018-081173 filed on Apr. 20, 2018, the contents of which are hereby incorporated by reference.

BACKGROUND

The technique according to the present disclosure relates to an image forming apparatus and a non-transitory computer-readable recording medium suitable for extracting an area of an image specified by a handwritten marker by a line marker such as a fluorescent highlighter pen or the like, and an electronic marker by a digital pen.

For example, in an image forming apparatus such as an MFP (Multifunction Peripheral) and the like, there are models incorporating a method called marker editing. This is method that a user indicates an area on a document by a handwritten marker by a line marker such as a fluorescent highlighter pen or the like, instead of specifying coordinate points on a digitizer. This method is performing editing process, after scanning the document, that is extracting an area using the handwritten marker, trimming, masking, color processing and the like.

As an apparatus related to this kind of marker editing, in typical technology, there is a color image processing apparatus that extracts a marker color from a full color image with high accuracy. This color image processing apparatus is a color image processing apparatus having an image input unit for reading color documents and inputting color signals of plural colors. In this color image processing apparatus, a unit for determining fluorescent color determines the fluorescent color from an input color signal or from another color signal obtained by color-conversion of that input color signal. A unit for performing image editing performs image editing on an area specified by the fluorescent color according to the determination result.

SUMMARY

The image forming apparatus according to the present disclosure includes a scanner unit, a panel unit, an electronic marker input unit, and an area extracting unit. The scanner unit reads a first document having an area indicated by a handwritten marker by a fluorescent color line marker. The panel unit displays first image data of the first document read by the scanner unit or second image data of a second document stored in a storage device. The electronic marker input unit indicates an area by an electronic marker with respect to the second image data. The area extracting unit, based on a hue difference, which is a difference between a color of the first document read by the scanner unit and a color of the handwritten marker, corrects a hue difference, which is a difference between a color of the second document and a color of the electronic marker, and extracts an area indicated by the handwritten marker or an area by the electronic marker.

The non-transitory computer-readable recording medium according to the present disclosure stores an image forming program to be executed by a computer controlling an image forming apparatus. When the computer executes the image forming program, a scanner unit reads a first document having an area indicated by a handwritten marker by a fluorescent color line marker. A panel unit displays first image data of the first document read by the scanner unit or second image data of a second document stored in a storage device. An electronic marker input unit indicates an area by an electronic marker with respect to the second image data. An area extracting unit, based on a hue difference, which is a difference between a color of the first document read by the scanner unit and a color of the handwritten marker, corrects a hue difference, which is a difference between a color of the second document and a color of the electronic marker, and extracts an area indicated by the handwritten marker or an area by the electronic marker.

DETAILED DESCRIPTION

Hereinafter, an embodiment of an image forming apparatus according to the present disclosure will be described with reference to FIGS. 1 to 4. It should be noted that the image forming apparatus described below is a MFP (multifunction peripheral), which is a multifunctional peripheral apparatus incorporating standard mounted functions such as a printing function, a copying function, a FAX function, a data transmitting/receiving function via a network, and the like.

Figure 1:
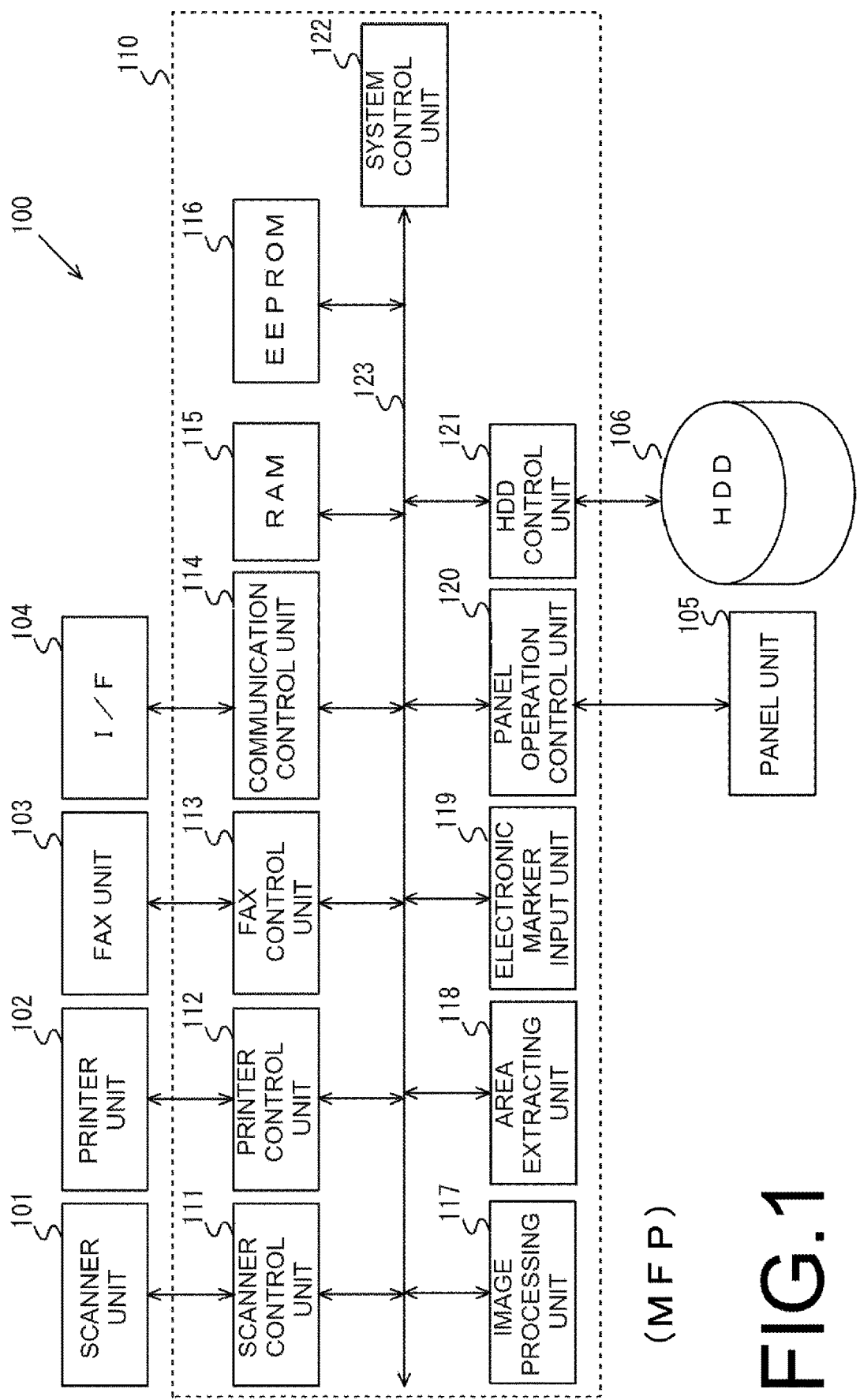
FIG. 1 is a view for explaining an embodiment in a case where an image forming apparatus according to this disclosure is applied to an MFP.

First, as illustrated in FIG. 1, the MFP 100 includes a control unit 110 that controls operations of a scanner unit 101, a printer unit 102, a FAX (facsimile) unit 103, an I/F (interface) 104, a panel unit 105, and a HDD (Hard Disk Drive) 106.

The scanner unit 101 is a device that converts an image of a document 200 illustrated in element A in FIG. 3 described later that is read by an image sensor into digital image data and inputs the digital image data to the control unit 110. The printer unit 102 is a device that prints an image on paper based on printing data outputted from the control unit 110. The FAX unit 103 is a device that transmits data outputted from the control unit 110 to a facsimile of another party, or receives data from a facsimile of another party via a telephone line and inputs the data to the control unit 110.

The I/F 104 is connected to another MFP 100, a user terminal, or the like via a network. It should be noted that the I/F 104 may be in charge of communication with a content server, a web server, or the like. The panel unit 105 is a device such as a touch panel or the like that performs a printing function, a copying function, a FAX function, a data transmitting/receiving function via a network, and a display for various settings of the MFP 100. The HDD 106 is a storage device that stores application programs and the like for providing various functions of the MFP 100. In addition, the HDD 106, for example, also has a user box for storing image data of printing jobs registered from the user terminal side, print correspondence data according to the page description language, and the like. Moreover, the HDD 106 also stores setting value data set by a user, user registration data of each user, and the like.

The control unit 110 is a processor that controls the overall operation of the MFP 100 by executing an application program such as an authentication program or the like, an image forming program, a control program, and the like. The control unit 110 includes a scanner control unit 111, a printer control unit 112, a FAX control unit 113, a communication control unit 114, a RAM (Random Access Memory) 115, an EEPROM (Electrically Erasable Programmable Read Only Memory) 116, an image processing unit 117, an area extracting unit 118, an electronic marker input unit 119, a panel operation control unit 120, an HDD control unit 121, and a system control unit 122. In addition, these are connected to a data bus 123.

The scanner control unit 111 controls the reading operation of the scanner unit 101. The printer control unit 112 controls the printing operation of the printer unit 102. The FAX control unit 113 controls the data transmitting/receiving operation by the FAX unit 103. The communication control unit 114, via the I/F 104, controls transmission and reception of data and the like via a network.

The RAM 115 is a work memory for executing a program. In addition, the RAM 115 stores printing data that has undergone image processing by the image processing unit 117. The EEPROM 116 stores a control program for performing an operation check or the like of each unit. Moreover, the EEPROM 116 also stores firmware including version data for operating the scanner unit 101, the printer unit 102, the FAX unit 103, the I/F (interface) 104, the panel unit 105, the HDD 106 and the like.

The image processing unit 117 performs image processing (rasterization) on image data that is read by the scanner unit 101. In addition, the image processing unit 117 performs image processing (rasterization) on printing target data registered in a user box of the HDD 106. Note that the system control unit 122 temporarily stores the printing data that has undergone image processing by the image processing unit 117 in the RAM 115.

The area extracting unit 118 extracts areas 210*a* and 211*a* (refer to elements B, E in FIG. 3 to be described later) specified by a handwritten marker 210 (refer to element B in FIG. 3 to be described later) by a line marker such as a fluorescent highlighter pen or the like (refer to element B in FIG. 3 to be described later) or by an electronic marker 211 (refer to element E in FIG. 3 to be described later). This will be described in detail later. The panel operation control unit 120 controls the display operation of the panel unit 105. Moreover, the panel operation control unit 120, via the panel unit 105, receives instructions or the like for starting printing, copying, a FAX, data transmitting/receiving via a network, or the like, or instructions or the like for starting setup when changing or registering settings of the operation mode or the like of an MFP 100A, 100B.

The system control unit 122 controls cooperative operation of each of the units and the like. In addition, when copying, printing, or the like is selected via the panel unit 105, the system control unit 122, via that scanner control unit 111 or the printer control unit 112, controls reading of a document by the scanner unit 101 or printing on paper by the printer unit 102. Moreover, when the panel operation control unit 120 receives an instruction to extract the area 210*a* of a document 200 or to extract the area 211*a* of an image data document 200 via the panel unit 105, the system control unit 122 instructs the area extracting unit 118 to extract the areas 210*a*, 211*a*. The document 200 is illustrated in elements A and B and the like in FIG. 3 to be described later. The image data document 200 is illustrated in elements D and E in FIG. 3 to be described later.

Next, with reference to FIG. 2, an example of the configuration of the area extracting unit 118 will be described. The area extracting unit 118 includes a handwritten marker detecting unit 118*a*, a hue difference detecting unit 118*b*, a hue difference holding unit 118*c*, an area detecting unit 118*d*, an area extracting unit 118*e*, a hue difference correcting unit 118*f*, and an electronic marker detecting unit 118*g*.

The handwritten marker detecting unit 118*a* detects a handwritten marker 210 attached to an image data document 200 illustrated in element B of the later-described FIG. 3 read by the scanner unit 101. Here, in a case of detecting the handwritten marker 210, the handwritten marker detecting unit 118*a* determines the presence or absence of a fluorescent color from the document 200 read by the scanner unit 101, and may detect a location where the fluorescent color can be determined as the handwritten marker 210. The hue difference detecting unit 118*b* detects a hue difference, which is the difference between the color of the image data document 200 illustrated in element B in FIG. 3 described later and the color of the handwritten marker 210 attached to the image data document 200, for example. The hue difference holding unit 118*c* holds the hue difference detected by the hue difference detecting unit 118*b*. The area detecting unit 118*d* detects the area 210*a* indicated by the handwritten marker 210 illustrated in element B in FIG. 3 described later. In addition, the area detecting unit 118*d* detects the area 211*a* indicated by the electronic marker 211 illustrated in element E in FIG. 3 described later.

The area extracting unit 118*e* extracts the area 210*a* indicated by the handwritten marker 210 detected by the area detecting unit 118*d*, as illustrated in element C in FIG. 3 described later. In addition, the area extracting unit 118*e* extracts the area 211*a* indicated by the electronic marker 211 detected by the area detecting unit 118*d*, as illustrated in element C in FIG. 3 described later. The hue difference correcting unit 118*f* corrects the hue difference, which is the difference between the color of the document 200 indicated by the image data of element E in FIG. 3 described later and the color of the electronic marker 211. In other words, in the hue difference correcting unit 118*f*, it will be described when the hue difference between the color of the image data document 200 and the color of the electronic marker 211 is larger than a hue difference held by the hue difference holding unit 118*c*. In this case, for example, in the hue circle in which the hues are annularly arranged, the hue difference correcting unit 118*f* brings the color of the electronic marker 211 closer to the color of the document 200 and corrects so as to be closer to the hue difference held by the hue difference holding unit 118*c*.

The electronic marker detecting unit 118g detects the electronic marker 211 attached to the image data document 200 illustrated in the element E in FIG. 3 to be described later displayed on the panel unit 105, for example. Here, the electronic marker detecting unit 118g may determine the presence or absence of image data indicating the electronic marker 211 from the image data of the document 200, for example, and detect the location where the image data of the electronic marker 211 can be determined as the electronic marker 211.

Next, an example of area extraction by the area extracting unit 118 will be described with reference to FIG. 3. First, element A in FIG. 3 illustrates a paper document 200 on which a handwritten marker 210 is written. Here, a fluorescent color is used as the color of the handwritten marker 210 to facilitate detection of the handwritten marker 210. Element B in FIG. 3 illustrates an image data document 200 in a case where the paper document 200 of element A in FIG. 3 is scanned by the scanner unit 101. Here, on the image data document 200, the handwritten marker 210 and the area 210a indicated by the handwritten marker 210 are displayed. Element C in FIG. 3 is a diagram illustrating a case where the area 210a is extracted from the image data document 200 element B in FIG. 3.

Figure 3:
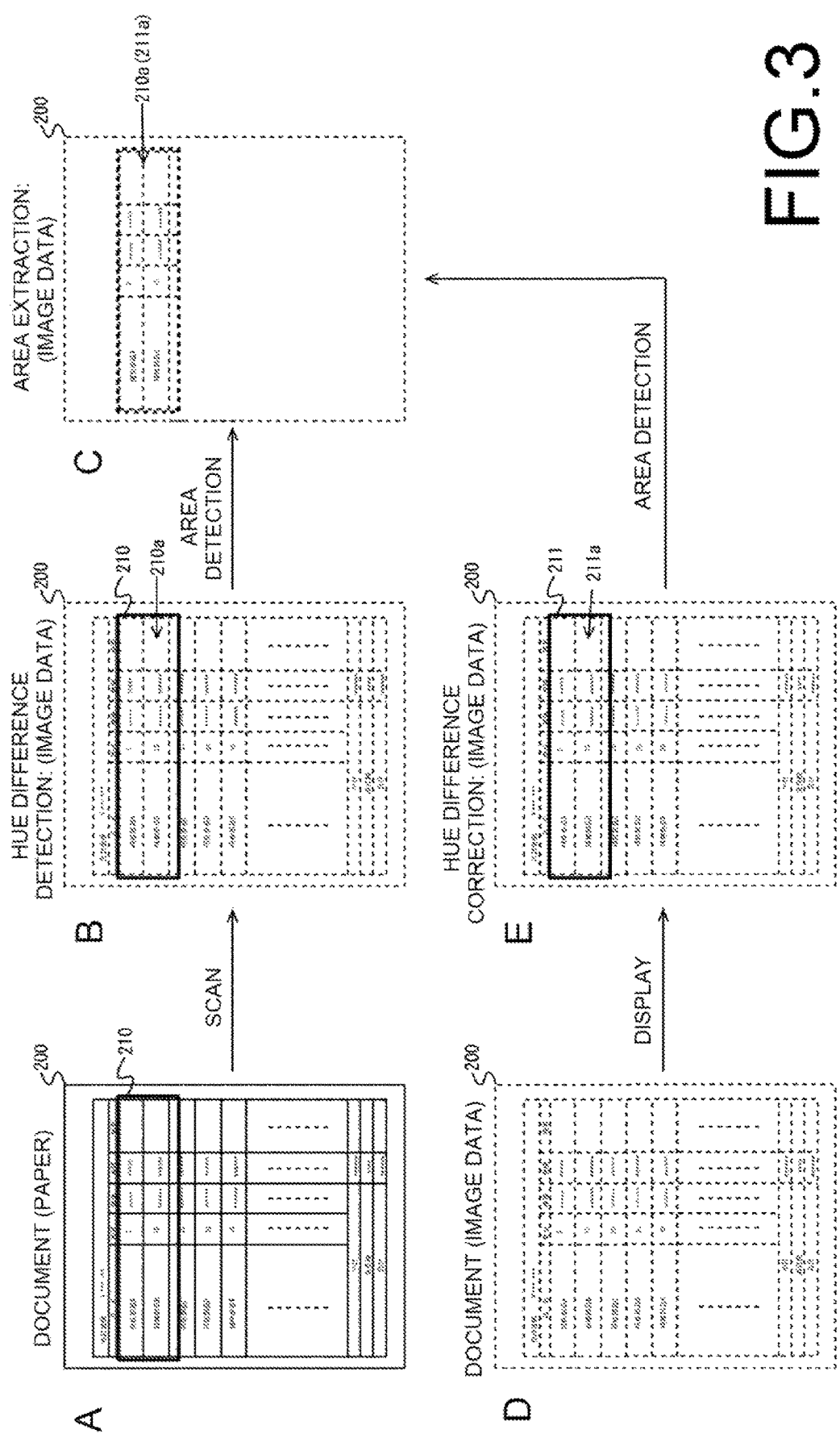
FIG. 3 illustrates an example of area extraction by the area extracting unit in FIG. 1. Element A in FIG. 3 is a diagram illustrating a paper document on which a marker is written. Element B in FIG. 3 is a diagram illustrating a document of image data in a case where the document of element A in FIG. 3 is scanned. Element C in FIG. 3 is a diagram illustrating a case where an area is extracted from the document of image data of element B in FIG. 3. Element D in FIG. 3 is a diagram illustrating a document of image data on which no marker is written. Element E in FIG. 3 is a diagram illustrating a case where an electronic marker is written on a document of image data.

Element D in FIG. 3 is a diagram illustrating an image data document 200 in which the electronic marker 211 illustrated in element E in FIG. 3 to be described later is not written. The image data document 200 on which the electronic marker 211 is not written is stored in the RAM 115 or the like, and is displayed on the panel unit 105 when extracting an area 211a illustrated in element E in FIG. 3 to be described later. Element E in FIG. 3 illustrates a case where the electronic marker 211 is written on the image data document 200. Here, the hue difference, which is the difference between the color of the electronic marker 211 and the color of the image data document 200 illustrated in element E in FIG. 3, is corrected to become the hue difference, which is the difference between the color of the handwritten marker 210 illustrated in element B in FIG. 3 and the color of the image data document 200.

Figure 4:
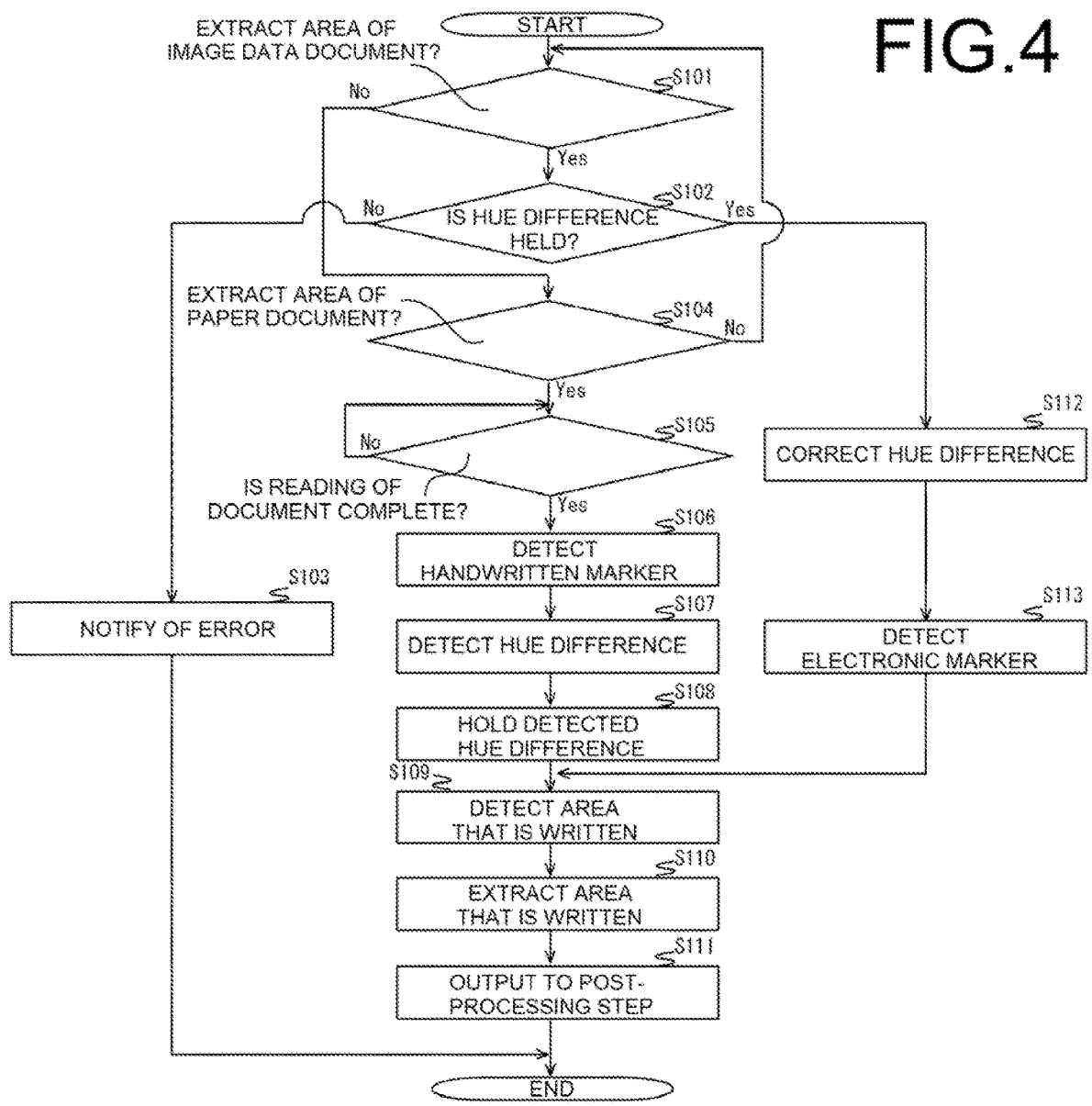
FIG. 4 is a flowchart for explaining an area extraction process by the MFP in FIG. 1.

Next, the extraction process in the MFP 100 for extracting the areas 210a, 211a will be described with reference to FIG. 4. Note that in the following description a case will be explained in which it is presumed that the area extracting unit 118 extracts the areas 210a and 211a of the document 200 in accordance with activation of a marker detection application. Moreover, in the following description, it is presumed that the color of the paper document 200 of element A in FIG. 3 is the same as the color of the document 200 indicated by the image data of element D in FIG. 3. In other words, the document 200 of element D in FIG. 3 is the image data previously read by the scanner unit 101 without being written by the handwritten marker 210. In addition, in the following description, it is presumed that the hue difference holding unit 118c illustrated in FIG. 2 does not hold the hue difference.

(Step S101)

The area extracting unit 118 confirms whether or not to perform extraction of the area 211a of the image data document 200.

In this case, when there is no notification from the system control unit 122 indicating extraction of the area 211a of the image data document 200, the area extracting unit 118 confirms that extraction of the area 211a of the image data document 200 is not to be performed (step S101: NO), and the process proceeds to step S104.

On the other hand, when there is a notification from the system control unit 122 indicating extraction of the area 211a of the image data document 200, the area extracting unit 118 confirms that extraction of the area 211a of the image data document 200 is to be performed (step S101: YES), and the process proceeds to step S102.

Here, when the marker detection application is activated, and there is no notification from the panel operation control unit 120, the system control unit 122 determines that there is no instruction to extract the area 211a of the image data document 200. This is the case where this notification indicates that an instruction to extract the area 211a of the image data document 200 stored in the RAM 115 has been received via the panel unit 105.

On the other hand, when there is a notification from the panel operation control unit 120, the system control unit 122 determines that there is an instruction to extract the area 211a of the image data document 200. This is the case where this notification indicates that an instruction to extract the area 211a of the image data document 200 stored in the RAM 115 has been received via the panel unit 105.

(Step S102)

The area extracting unit 118 confirms whether or not the hue difference is held.

Figure 2:
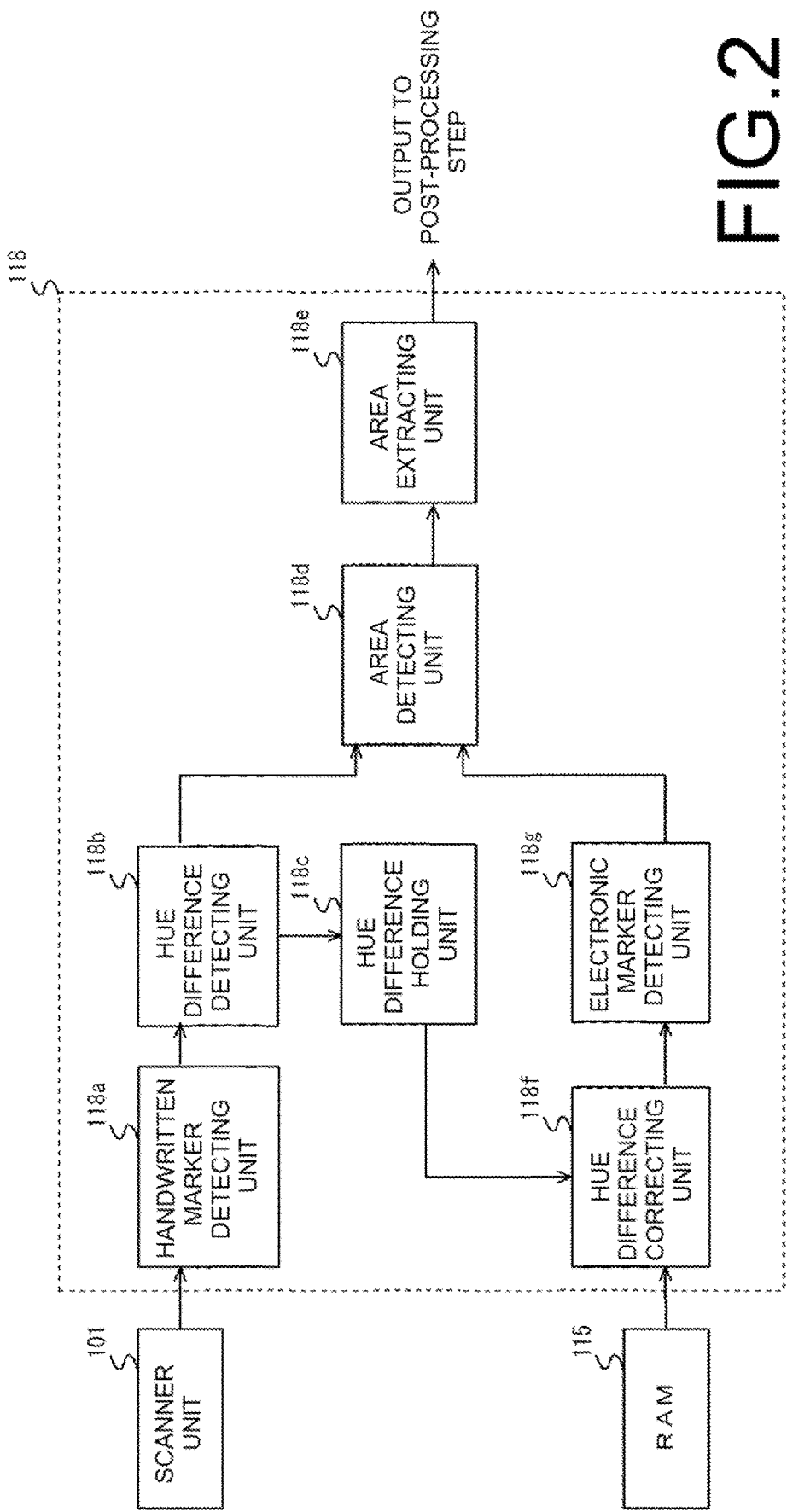
FIG. 2 is a diagram for describing an example of the configuration of the area extracting unit in FIG. 1.

In this case, when the hue difference holding unit 118c in FIG. 2 does not hold the hue difference, the area extracting unit 118 confirms that the hue difference is not held (step S102: NO), and the process proceeds to step S103.

On the other hand, when the hue difference holding unit 118c in FIG. 2 holds the hue difference, the area extracting unit 118 confirms that the hue difference is held (step S102: YES), and the process proceeds to step S112.

(Step S103)

The area extracting unit 118 notifies the system control unit 122 of an error. In other words, when the hue difference holding unit 118c does not hold the hue difference, the area extracting unit 118 cannot correct the hue difference between the color of the document 200 indicated by the image data and the color of the electronic marker 211. In this case, the area extracting unit 118 may not be able to extract the area 211a of the image data document 200, so notifies the system control unit 122 of an error.

At this time, the system control unit 122, via the panel operation control unit 120, may display an error on the panel unit 105 indicating that it may not be possible to extract the area 211a of the image data document 200.

(Step S104)

The area extracting unit 118 confirms whether or not extraction of the area 210a of the paper document 200 is to be performed.

In this case, when there is no notification from the system control unit 122 indicating the extraction of the area 210a of the paper document 200, the area extracting unit 118 confirms no extraction of the area 210a of the paper document 200 (step S104: NO), and the process returns to step S101.

On the other hand, when there is a notification from the system control unit 122 indicating the extraction of the area 210a of the paper document 200, the area extracting unit 118 confirms extraction of the area 210a of the paper document 200 (step S104: YES), and the process proceeds to step S105.

Here, when the marker detection application is activated, and there is no notification from the panel operation control unit 120, the system control unit 122 determines that there is no instruction to extract the area 210a of the paper document 200. This is a case where this notification indicates that an instruction to extract the area 210*a* of the paper document 200 has been received via the panel unit 105.

On the other hand, when there is a notification from the panel operation control unit 120, the system control unit 122 determines that there is an instruction to extract the area 210*a* of the paper document 200. This is a case where this notification indicates that an instruction to extract the area 210*a* of the paper document 200 has been received via the panel unit 105.
(Step S105)

The area extracting unit 118 confirms whether or not reading of the paper document 200 is complete.

In this case, when there is no notification from the system control unit 122 indicating that reading of the paper document 200 by the scanner unit 101 is complete, the area extracting unit 118 confirms that reading of the paper document 200 is not complete (step S105: NO).

However, when there is a notification from the system control unit 122 indicating that reading of the paper document 200 by the scanner unit 101 is complete, the area extracting unit 118 confirms that reading of the paper document 200 is complete (step S105: YES), and the process proceeds to step S106.

Here, when there is no notification from the scanner control unit 111 indicating that reading of the paper document 200 by the scanner unit 101 is complete, the system control unit 122 determines that reading of the paper document 200 is not complete.

On the other hand, when there is a notification from the scanner control unit 111 indicating that reading of the paper document 200 by the scanner unit 101 is complete, the system control unit 122 determines that reading of the paper document 200 is complete.
(Step S106)

The handwritten marker detecting unit 118*a* of the area extracting unit 118 detects the handwritten marker 210.

In this case, the handwritten marker detecting unit 118*a* determines the presence or absence of a fluorescent color from the document 200 read by the scanner unit 101, for example, and detects the portion where the fluorescent color can be determined as the handwritten marker 210.
(Step S107)

The hue difference detecting unit 118*b* of the area extracting unit 118 detects a hue difference.

In this case, the hue difference detecting unit 118*b* detects the hue difference, which is, for example, the difference in the color of the image data document 200 illustrated in Element B in FIG. 3 and the color of the handwritten marker 210 attached to the image data document 200.
(Step S108)

The hue difference holding unit 118*c* of the area extracting unit 118 holds the hue difference.

In this case, the hue difference holding unit 118*c* holds the hue difference detected by the hue difference detecting unit 118*b*.
(Step S109)

The area detecting unit 118*d* of the area extracting unit 118 detects the area 210*a* that is written.

In this case, the area detecting unit 118*d* detects the area 210*a* indicated by the handwritten marker 210 illustrated in Element B in FIG. 3 detected by the handwriting marker detecting unit 118*a*.
(Step S110)

The area extracting unit 118*e* of the area extracting unit 118 extracts the area 210*a* that is written.

In this case, the area extracting unit 118*e* extracts the area 210*a* indicated by the handwritten marker 210 detected by the area detecting unit 118*d*, as illustrated in element C in FIG. 3.
(Step S111)

The area extracting unit 118 outputs the image of the area 210*a* extracted by the area extracting unit 118*e* to a post-processing step.

Here, in a case where the post-processing step is, for example, character recognition, the area extracting unit 118 outputs the image of the area 210*a* extracted by the area extracting unit 118*e* to the OCR (Optical Character Reader) side.
(Step S112)

The hue difference correcting unit 118*f* of the area extracting unit 118 corrects the hue difference, which is the difference between the color of the document 200 indicated by the image data and the color of the electronic marker 211.

In this case, the hue difference correcting unit 118*f* corrects the hue difference, which is the difference between the color of the document 200 indicated by the image data of element D in FIG. 3 and the color of the electronic marker 211 based on the hue difference held by the hue difference holding unit 118*c*. In other words, in the hue difference correcting unit 118*f*, it will be described when the hue difference between the color of the image data document 200 and the color of the electronic marker 211 is larger than a hue difference held by the hue difference holding unit 118*c*. In this case, for example, in the hue circle in which the hues are annularly arranged, the hue difference correcting unit 118*f* brings the color of the electronic marker 211 closer to the color of the document 200 and corrects so as to be closer to the hue difference held by the hue difference holding unit 118*c*.
(Step S113)

The electronic marker detecting unit 118*g* of the area extracting unit 118 detects the electronic marker 211, and the process proceeds to step S109.

In this case, the electronic marker detecting unit 118*g* may determine the presence or absence of image data indicating the electronic marker 211 from the image data of the document 200, for example, and may detect the location where the image data of the electronic marker 211 can be determined as the electronic marker 211.

Incidentally, in a case where the electronic marker detecting unit 118*g* detects the electronic marker 211, in step S109, the area detecting unit 118*d* of the area extracting unit 118 detects the area 211*a* indicated by the electronic marker 211 illustrated in the element E in FIG. 3.

In addition, in step S110, the area extracting unit 118*e* of the area extracting unit 118 extracts the area 211*a* indicated by the electronic marker 211 detected by the area detecting unit 118*d* illustrated by element C in FIG. 3.

Note that in the above description, the color of the paper document 200 of the element A in FIG. 3 is the same as the color of the document 200 indicated by the image data of the element D in FIG. 3. However, the color of the paper document 200 of element A in FIG. 3 may be different from the color of the document 200 indicated by the image data of element D in FIG. 3. In this case, the hue difference correcting unit 118*f* corrects the hue difference, which is the difference between the color of the document 200 indicated by the image data of element D in FIG. 3 and the color of the electronic marker 211. This is based on the hue difference, which is the difference between the color of the paper document 200 of element A in FIG. 3 read by the scanner unit 101 and the color of handwritten marker 210. As a result, it is possible to detect the extraction area specified by the same marker detection application.

In this way, in this embodiment, the document 200 (first document) having the area 210a indicated by the handwritten marker 210 by the fluorescent color line marker is read by the scanner unit 101; the panel unit 105 displays the image data (first image data) of the document 200 (first document) read by the scanner unit 101 or image data (second image data) of a document 200 (second document) stored in a RAM 115 (storage device); the electronic marker input unit 119 indicates the area 211a by the electronic marker 211 with respect to the image data (second image data); the area extracting unit 118, based on the hue difference, which is the difference between the color of the document 200 (the first document) read by the scanner unit 101 and the color of the handwriting marker 210, corrects the hue difference, which is the difference between the color of the document 200 (the second document) and the color of the electronic marker 211, and extracts the area 210a indicated by the handwritten marker 210 or the area 211a by the electronic marker 211.

As a result, even in the following cases, the hue difference, which is the difference between the color of the document 200 (second document) and the color of the electronic marker 211, may be corrected so as to match the hue difference, which is the difference between the color of the document 200 (first document) and the color of the handwritten marker 210. This is the case where the shade of color of each marker of the handwritten marker 210 and the electronic marker 211 in the data state are different. Furthermore, this is the case where the color of the document 200 itself whose extraction area is specified by the handwritten marker 210 is different from the color of the document 200 before scanning, in which the area 211a is specified by the electronic marker 211. As a result, even in a case where the extraction area is specified by either the handwritten marker 210 or the electronic marker 211, the extraction area specified by the same marker detection application may be detected.

In the color image processing apparatus of the typical technique described above, marker editing is performed using fluorescent color, whereby marker editing such as trimming, masking, color conversion, synthesis, and the like may be performed with high accuracy not only for black and white images but also for full color images.

Incidentally, when specifying an extraction area in marker editing, the following two methods are conceivable. First, it is conceivable to scan a document whose extraction area is specified by a handwritten marker using a line marker such as a fluorescent highlighter pen or the like. In addition, it is conceivable to display an image of a document that is scanned and converted into data and to specify an extraction area by an electronic marker such as a digital page or the like.

However, even in a case where the color of the handwritten marker is the same as the color of the electronic marker, the shade of color of each marker may be different. More specifically, in the case of a handwritten marker, when the writing position of the handwritten marker overlaps with characters, border lines, or the like printed on the document, the characters and border lines may be transparent. In this case, when the document is scanned and converted into data, the color of the handwritten marker may change. On the other hand, in the case of an electronic marker, when the transmittance of the electronic marker is zero, for example, even when the writing position of the electronic marker overlaps with a character, a border line, or the like of the document, since characters and border lines cannot be seen through, the color of the electronic marker does not change.

In this way, in some cases the handwritten marker and the electronic marker in the state of being converted into data may have different shades of color of the respective markers, and there is a possibility that the same marker detection application may not detect the specified area. Furthermore, in a case where the color of the document itself whose extraction area is specified by the handwritten marker is different from the color of the document before scanning in which the extraction area is specified by the electronic marker, the difference in the shade of color of each marker becomes conspicuous.

Accordingly, development of an apparatus capable of detecting an extraction area specified by the same marker detection application is desired, even in a case where an extraction area is specified by either a handwritten marker or an electronic marker.

With the image forming apparatus and the recording medium according to the present disclosure, the hue difference, which is the difference between the color of the second document and the color of the electronic marker, is corrected so as to match the hue difference, which is the difference between the color of the first document and the color of the handwritten marker. As a result, even in a case where an extraction area is specified by either a handwritten marker or an electronic marker, the extraction area specified by the same marker detection application may be detected.

What is claimed is:

1. An image forming apparatus, comprising:
a scanner unit for reading a first document having an area indicated by a handwritten marker by a fluorescent color line marker;
a panel unit for displaying first image data of the first document read by the scanner unit or second image data of a second document stored in a storage device;
an electronic marker input unit for indicating an area by an electronic marker with respect to the second image data; and
an area extracting unit that, based on a first hue difference, which is a difference between a color of the first document read by the scanner unit and a color of the handwritten marker, corrects a second hue difference, which is a difference between a color of the second document and a color of the electronic marker, and extracts an area indicated by the handwritten marker or an area by the electronic marker; wherein
the area extracting unit corrects the color of the electronic marker with respect to the color of the second document so that the second hue difference matches the first hue difference.

2. The image forming apparatus according to claim 1, wherein
the area extracting unit has:
a handwritten marker detecting unit that detects the handwritten marker attached to the first document read by the scanner unit;
a hue difference detecting unit for detecting the first hue difference;
a hue difference holding unit that holds the first hue difference detected by the hue difference detecting unit;
an area detecting unit that detects an area indicated by the handwritten marker detected by the handwritten marker detecting unit;
an area extracting unit that extracts an area indicated by the handwritten marker detected by the area detecting unit;

a hue difference correcting unit that corrects the second hue difference between a color of the second document indicated by the second image data and a color of the electronic marker so as to match the first hue difference held by the hue difference holding unit; and an electronic marker detecting unit for detecting the electronic marker;

the area detecting unit detects an area indicated by the electronic marker detected by the electronic marker detecting unit; and the area extracting unit extracts an area indicated by the electronic marker detected by the area detecting unit.

3. A non-transitory computer-readable recording medium for storing an image forming program to be executed by a computer controlling an image forming apparatus, and when the computer executes the image forming program, a scanner unit reads a first document having an area indicated by a handwritten marker by a fluorescent color line marker;

a panel unit displays first image data of the first document read by the scanner unit or second image data of a second document stored in a storage device;

an electronic marker input unit indicates an area by an electronic marker with respect to the second image data; and an area extracting unit, based on a first hue difference, which is a difference between a color of the first document read by the scanner unit and a color of the handwritten marker, corrects a second hue difference, which is a difference between a color of the second document and a color of the electronic marker, and extracts an area indicated by the handwritten marker or an area by the electronic marker; wherein the area extracting unit corrects the color of the electronic marker with respect to the color of the second document so that the second hue difference matches the first hue difference.

\* \* \* \* \*